United States Patent [19]

Shutt

[11] 4,168,175
[45] Sep. 18, 1979

[54] FIRE RETARDANT COMPOSITIONS

[75] Inventor: Thomas C. Shutt, St. Louis, Mo.

[73] Assignee: Vitrofil Corporation, Denver, Colo.

[21] Appl. No.: 899,925

[22] Filed: Apr. 26, 1978

[51] Int. Cl.² .............................................. C09K 3/28
[52] U.S. Cl. ................................ 106/15.05; 252/8.1;
162/159; 162/181 A; 162/181 B; 428/921
[58] Field of Search .............. 106/15 FP, 16; 252/8.1;
428/920, 921; 162/159, 181 A, 181 C

[56] References Cited

U.S. PATENT DOCUMENTS

| | | | |
|---|---|---|---|
| 2,542,721 | 1/1947 | Stafford | 106/15 FP |
| 3,082,121 | 3/1963 | Donaldson et al. | 106/15 FP |
| 3,996,325 | 12/1976 | Megraw | 162/159 |
| 4,016,131 | 4/1977 | Shutt et al. | 260/40 R |

*Primary Examiner*—Lorenzo B. Hayes
*Assistant Examiner*—Willie Thompson
*Attorney, Agent, or Firm*—Arthur A. March

[57] ABSTRACT

Fire retardant generally non-caking compositions of intimately intermixed ammonium phosphate, e.g. mono- and/or diammonium phosphate; sodium tetraborate containing molecularly bound water, e.g. the decahydrate, borax; and fractured finely ground solid powder particles of soda-containing silicate glass which have a high and irregular surface area and an active dry moisture absorbent surface condition for maintaining the particles of ammonium phosphate and sodium tetraborate in moisture protected disposition and for inhibiting the tendency of such particles to adhere to one another; the three components having an average particle size below about 4 mesh, the ammonium phosphate and sodium tetraborate being present in a combined predominant amount effective for imparting an active fire retarding property to cellulosic materials, and the resulting admixture being substantially dry and free flowing with the individual particles thereof in substantially uniform and non-caking distribution;

corresponding combinations of such compositions with fibers of cellulosic material forming composite fire retardant products in which the three components are in substantially uniform distribution throughout the cellulosic material and in intimate association with the corresponding fibers thereof, and particularly loose fill structural products in which the individual particles of glass, borax and phosphate are disposed in situ in entwined relation with the adjacent cellulosic fibers; and methods of preparing such composition in the substantial absence of moisture and of autogenous mixing heat, and in turn methods of preparing such composite fire retardant products.

32 Claims, No Drawings

FIRE RETARDANT COMPOSITIONS

The present invention relates to the provision for improved fire retardant compositions in substantially dry and free flowing form, and corresponding composite fire retardant cellulosic products in which such compositions are effectively incorporated in situ.

Various known fire retardant agents have been used heretofore, either alone or in association with other agents, for purposes of enhancing the fire retardancy of particular inflammable materials.

Thus, U.S. Pat. No. 2,225,831 to Herz concerns a dilute aqueous fire proofing solution of borax, ammonium phosphate and ammonium chloride for impregnating fabric, paper, card-board, wood, electrical insulation, and the like, preferably with auxiliary agents which have been subjected to irradiation also being included for increasing the adhesive, preservative, fungicidal and similar properties of the final impregnating medium. No glass component is included in the formulation.

U.S. Pat. No. 2,386,471 to Jones et al discloses a similar liquid impregnating system including mono ammonium or diammonium phosphate, ammonia, copper sulfate and a wetting agent, usable as a dilute aqueous solution for fireproofing the wood of frame dwelling interiors. No glass component is contemplated in the liquid system.

U.S. Pat. No. 2,542,721 to Stafford discloses a liquid asphalt paint coating for waterproofing and fire retarding the roof of a building, in which besides an organic solvent for the asphalt, zinc borate, asbestos fibers and expanded perlite cellular granules of crude volcanic glass are provided, optionally with the additional inclusion of borated pine resin which acts as a foaming agent during burning to produce an insulating structure. The basic ingredients are specific to the asphalt matrix since the extremely low density and buoyancy of the expanded cellular perlite causes it to migrate to the top surface of the applied coating where it acts as a heat and flame insulating material during burning, whereas the zinc borate upon exposure to the flame is converted into an insulating slag which retards exudation of flow of molten asphalt from the sloping roof, while the asbestos fibers increase the flow resistance of the coating at high temperature, impart toughness to the burned coating and knit together and reinforce the burned and unburned coating portions. No ammonium phosphate component is contemplated in the liquid paint coating.

Abstract 61,695 (649 O.G. 603, published Aug. 14, 1951) to Little discloses coating or impregnating cellulosic or other inflammable materials with equal parts by weight of diammonium phosphate and borax or sodium tetraborate decahydrate apparently in a liquid carrier or solvent to reduce fire hazards. The composition is applied by conventional immersion, spraying or brushing, or by impregnation in a suitable commercial washer. No glass is contemplated in such liquid composition.

U.S. Pat. No. 4,016,131 to Thomas C. Shutt and L. Wayne Snider discloses the use in admixture with unsaturated polyester of specifically constituted substantially pre-cleaned, dry and moisture-protected, fractured, active, finely ground powder particles of soda-containing silicate glass, especially soda-lime-silicate glass, having a high and irregular surface area, an average particle size below e.g. about 40 mesh and an active cured polyester structurally reinforcing property, which represents a unique instance in which the glass additive functions not as a mere filler but as an active cooperating agent leading to enhancement of the physical and chemical properties of the polyester resin with consequent attendant advantages.

On the other hand, the particulate glass serving as an active cooperating agent according to said U.S. Pat. No. 4,016,131 cannot be art-regarded as a true flame retardant as so used or even where intended as a mere glass filler in polyester formulations anymore than conventional glass or other filler material is so art-regarded. Nor is the same particularly usable in flame retardant impregnating solutions or coatings.

In fact, it is well recognized that because of their chemical and physical characteristics, mixtures of ammonium phosphate and sodium tetraborate decahydrate in solid particulate form soon tend to stick together and cake into agglomerated clumps which are extremely difficult to break up into their original desirable fine particle size. This is believed to be caused by the take up of attendant extraneous moisture from the ambient environment by the particles of these materials, especially when present in admixture. Furthermore, the agglomeration is increased because in the processing of the product heat is generated during the operation of mixing them together and with a cellulose material, as hereinafter described. Hence, while the use of these two materials in impregnating or coating solutions may not pose a serious problem, inasmuch as the caked particles thereof are readily dissolved into the liquid impregnating or coating solvent or vehicle for uniform distribution therein and in turn for applying such liquid formulation to the already formed product to be rendered fire retardant, the problem remains unresolved when it is desired to utilize these two fire retardant agents in dry solid form for incorporation in situ in a cellulosic material for fire retarding purposes prior to actual formation of the ultimate structural product itself.

Such problem is particularly pronounced where it is sought to combine ammonium phosphate and borax, i.e. sodium tetraborate decahydrate, into a loose fiber pulp of cellulosic material to form an in situ composite fire retardant cellulosic product. To do so requires prolonged physical percussion treatment in a hammer mill or the like in order to achieve intimate admixture and uniform distribution of these two agents in the fiber pulp. Even were a wet pulp system to be employed, extended time, labor and energy would still be needed to attain an acceptable degree of intimate admixture and uniform distribution of such two agents in the fiber pulp mass, with consequent increase in cost of production. Of course, the dry fibers being pulped, by their very nature, themselves serve to buffer and absorb the percussion shock treatment of the mass and inhibit efficient break up of clumps or cakes of agglomerated particles of ammonium phosphate and borax or the like in the mass, thereby detracting from the uniformity of the distribution thereof in the pulped loose fibers and adding to the overall cost of production.

It is among the objects and advantages of the present invention to overcome the disadvantages and drawbacks heretofore encountered, and to provide an improved fire retardant, generally non-caking, composition in which ammonium phosphate and sodium tetraborate containing molecularly bound water are maintained in substantially dry and free flowing condition, with the individual particles thereof in substantially uniform and intimate distribution, and in the presence of a solid agent specially prepared and constituted for maintaining such particles in moisture protected disposition and for inhibiting the tendency of such particles to adhere to one another and cake together.

It is among the further objects and advantages of the present invention to provide such a composition in which such ammonium phosphate and sodium tetraborate are present in a combined predominant amount effective for imparting an active fire retarding property to cellulosic material, and which may be combined with fibers of cellulosic material in the presence of such solid agent so that the three components are evenly and uniformly distributed throughout the cellulosic material and disposed in intimate in situ association with the corresponding fibers thereof.

It is among the still further objects and advantages of the present invention to provide methods for preparing such improved fire retardant, generally non-caking, compositions in the substantial absence of moisture and in the substantial absence of autogenous mixing heat, and in turn to provide methods of preparing such composite fire retardant products, and particularly corresponding loose fill structural products.

It is among the still further objects and advantages of the present invention to provide such non-caking compositions, composite in situ products, and corresponding preparation methods at low cost in terms of raw materials, treating equipment, manufacturing steps, production time, and the like, while simultaneously enhancing the chemical and physical attributes of the compositions and composite products, especially in terms of the intimacy and uniformity of the distribution of the three components of the fire retardant composition in the cellulosic material and the more effective resultant fire retardancy thereof in their in situ disposition in the final structural products obtained.

Other and further objects and advantages of the present invention will become apparent from a study of the within specification and accompanying examples as the artisan will appreciate.

Briefly, the present invention provides, according to one aspect thereof, an improved fire retardant, and generally non-caking, composition comprising an intimate finely divided solids particulate admixture of ammonium phosphate, sodium tetraborate containing molecularly bound water and specially prepared and constituted fractured finely ground solid powder particles of soda-containing silicate glass.

Significantly, the particles of such glass have a high and irregular surface area and an active dry moisture absorbent surface condition sufficiently effective for maintaining the particles of ammonium phosphate and sodium tetraborate in moisture protected disposition and for inhibiting the tendency of such particles to adhere to one another or cake together.

The three solid components in the admixture have an average particle size at least below about 4 mesh for suitably acceptable operation, although much smaller particle sizes are preferred for enhanced results. Also, the ammonium phosphate and sodium tetraborate are present in a combined predominant amount of the admixture which is suitably effective for imparting the desired active fire retarding property to the contemplated cellulosic material with which it is intended to be associated. By reason of the presence of the solid particles of glass as specially prepared and constituted active agent, the admixture is substantially dry and free flowing in form with the individual particles thereof in substantially even and uniform distribution therein.

It is completely surprising that the inclusion of this specially prepared and constituted active glass component could prevent the usual tendency of the ammonium phosphate and sodium tetraborate components to adhere to one another and cake together into difficultly crushable agglomerates. Because of its dry active moisture absorbent high surface area condition and uncoated surface nature, the glass component effectively scavenges any attendant moisture such as extraneous environmental or ambient moisture and prevents the same from fostering the undesired agglomeration of the particles of the other two components.

Such particles of glass, preferably and more specifically, are specially prepared and constituted as substantially pre-cleaned, dry and moisture-protected, fractured, active, uncoated, finely ground solid powder particles of soda-containing silicate glass having a high and irregular surface area and an active dry surface condition. More preferably, the particles of glass are soda-lime silicate glass. These particles of glass correspond to those contemplated in said U.S. Pat. No. 4,016,131, and may be obtained from sources and prepared for use in accordance with the disclosure therein.

The ammonium phosphate component may be either monoammonium phosphate, i.e. monobasic ammonium phosphate, $NH_4H_2PO_4$, or diammonium phosphate, i.e. dibasic ammonium phosphate, $(NH_4)_2HPO_4$, or both of these materials in admixture in any appropriate proportions, or the like, for achieving the desired fire retardant effect thereof.

The sodium tetraborate component may be any such tetraborate having molecularly bound water such as the decahydrate, i.e. borax, $Na_2B_4O_7 \cdot 10 H_2O$, or the pentahydrate, $Na_2B_4O_7 \cdot 5 H_2O$. The decahydrate is preferred because of its low cost and also because its higher water content enhances the fire retardant effect of this component by its quenching action upon molecular water release during the incipient stages of burning.

Generally, the admixture may broadly include on a weight basis between about 4–13 parts ammonium phosphate component, between about 13–6 parts sodium tetraborate component, and between about 1–9 parts of said particles of glass. In the case where the ammonium phosphate component is diammonium phosphate, the admixture may preferably include on a weight basis, more specifically, between about 5–13 parts diammonium phosphate, between about 12–8 parts sodium tetraborate component, especially the decahydrate, and between about 1–7 parts of said particles of glass. On the other hand, where the ammonium phosphate component is monoammonium phosphate, the admixture may preferably include on a weight basis, more specifically, between about 4–11 parts monoammonium phosphate, between about 13–8 parts sodium tetraborate component, especially the decahydrate, and between about 1–9 parts of said particles of glass.

Favorable results are especially obtainable when the weight ratio of the tetraborate:diammonium phosphate:glass is about 10:10:4, and correspondingly when the weight ratio of the tetraborate:monoammonium phosphate:glass is about 10:8-7:2-8, e.g. about 10:8.7:2.

As to the particle size of the various components contemplated, suitably at least about 40% by weight of the particles in the admixture should preferably have an average particle size below about 600 mesh and the remaining at most about 60% by weight of such particles should in turn have an average particle size below about 4 mesh and above about 600 mesh. However, it is more preferred that ideally at least about 80% by weight of the particles in the admixture have an average particle size below about 200 mesh and the remaining at most about 20% by weight of such particles have an average particle size below about 100 mesh and above about 200 mesh. While the composition may comprise admixtures having average particle size of below about 325 mesh, it is most preferred to provide all of the particles in an average particle size of about 200 mesh, as this will enhance ease in admixing and distribution thereof evenly and intimately in the admixture and in turn ease in achieving the desired in situ disposition of the components in the mass of fibers of cellulosic material for preparing the ultimate composite fire retardant product.

Naturally, the higher the portion of smaller average size particles present, the less tendency there will be for agglomeration of the particles into undesired larger sizes. More importantly, the higher the proportion of smaller average size particles of the active glass component present, the more effective will be the self-preserving moisture scavenging role thereof due to the concomitantly higher active surface area provided for moisture absorbing purposes.

In accordance with a further aspect of the present invention, the fire retardant composition admixture is combined advantageously with fibers of cellulosic material in the form of a composite fire retardant product in which the three components of the admixture are in substantially uniform distribution in situ throughout the cellulosic material and in effective intimate association with the corresponding fibers thereof.

Such composite product includes on a weight basis generally between about 10-30% of the three component admixture and between about 90-70% of the cellulosic material, although the preferable proportion is ideally about 20%, e.g. about 18% or 22% or 24%, of the admixture and about 80%, correspondingly e.g. about 82% or 78% or 76%, of the cellulosic material. If the composite formulation is too low in these three components, it will affect the fire and flame retardancy, whereas if it is too high in the three component admixture, the overall composition will, as well as being uneconomical, lose some of the properties such as efficient insulation for which the mixture is otherwise extremely desirable.

Advantageously, the composite fire retardant product is provided most effectively in the form of a selectively shaped and sized or loose fill type structural product in which the individual particles of the components are disposed in situ in entwined relation with the adjacent fibers of cellulosic material.

Pursuant to another aspect of the invention, a corresponding method is provided for producing the improved composite fire retardant cellulosic product which comprises incorporating the three component admixture of the foregoing type into cellulosic material. This is accomplished by intimately intermixing the admixture with individual loose fibers of the cellulosic material until the three components of the admixture are in substantially uniform distribution therein and the individual particles at least of the glass are disposed and remain in situ in entwined relation with the adjacent fibers of cellulosic material. The intermixing may be suitably effected by physical percussion of the ingredients in a mill such as a hammer mill whereby to achieve appropriate in situ association of the three admixture components with the fibers of cellulosic material.

In this same regard, a concomitant method is also contemplated herein for providing the basic fire retardant, generally non-caking, composition. This comprises intimately intermixing the three components of the admixture in substantially dry condition and in a confined environment in the substantial absence of moisture and in the substantial absence of autogenous mixing heat as in a mechanical mixer. This provides an excellent starting material as to size, form and nature for blending and mixing with the cellulosic material fibers for ultimately forming the composite fire retardant product having the three components distributed uniformly in situ therein, especially with at least the particles of the glass component in entwined relation with the adjacent cellulosic fibers.

The fibers of cellulosic material may be from any source as the artisan will appreciate, such as waste newsprint and/or cardboard, yet in fact any paper type cellulosic material may be utilized. The cellulosic source is only limited by the fact that it must provide the cellulosic fibers contemplated for combination in substantially individual and/or loose fiber condition with the three component admixture.

In formulating the three components to provide them in desired average particle size for the admixture, suitably the ammonium phosphate in dry form is ground in a hammer mill, the sodium tetraborate such as the decahydrate or less preferably the pentahydrate in dry form is ground in a micropulverizer, e.g. 60 ACM micropulverizer, and the glass in dry form and in moisture protected condition is ground in a ball mill. An air separator system is conveniently used to obtain the proper mesh size range of the three components to be utilized. The handling as well as the mixing together of these three ingredients must understandably take place not only under dry conditions, but also over very short periods of mechanical mixing time, since generation of friction heat or autogenous mechanical mixing heat, e.g. between the mixing blade and the sodium tetraborate, should be avoided. Ideal mixing times of about one minute are preferred, but in any case they should not exceed about five minutes in mechanical mixing duration. The avoidance of moisture should be closely controlled throughout.

The paper, cardboard, vegetable fiber, wood, or other source of cellulosic fibers may be suitably prepulped, for instance in a hammer mill, to provide predominantly the substantially individually loose fibers sought. The fiber pulp is then mixed together with the three component admixture. Alternatively, the three component admixture and source of cellulosic fibers are together subjected to the pulping and percussion action, for instance in a hammer mill, to blend and intimately interassociate the various ingredients from the very start. In either event, the appropriate particles of the admixture are physically entwined in the pulped paper or other fibers.

While in the initial dry mixing contact between the glass and other two components, the sharp edged particles of glass may be said possibly to serve to some extent as a mechanically facilitating break down agent by randomly cuttingly engaging any caking particles of the other two ingredients, on the other hand when the three components are blended with the fiber pulp, such sharp edged particles of glass understandably become particularly physically entwined in the loose pulp fibers and instead attain more effective even, uniform and intimate distribution in situ within the overall particle and pulp mass, as the artisan will appreciate.

Ideally, the ultimate composition will contain on a weight basis about 20% of the three component admixture and 80% of the fibers of cellulosic material, although a variant of about 10% on each side may be readily accommodated to provide the more liberal proportions of 10–30% to 90–70% of such ingredients respectively, as earlier mentioned.

While the reasons for the surprising and beneficial results of the various aspects of the present invention are not fully understood at this time, the following possible and plausible explanation is set forth by way of illustration and not limitation.

It is believed that the ammonium phosphate functions as a precursor of phospheric acid in the associative environment in question, and that heat generated during incipient burning of the composite fire retardant cellulosic material product causes the liberation of gases such as ammonium, leaving behind phosphoric acid, i.e. orthophosphoric acid. It is believed that such phosphoric acid in turn acts as a nascently available active in situ influencing agent which in effect causes the smoldering or glowing carbonaceous material of the cellulosic fibers, catalytically or otherwise, to react with oxygen, in a manner preferentially producing carbon monoxide over carbon dioxide, i.e. at the confined localized site of incipient burning, smoldering or glowing of the affected carbonaceous material present in the vicinal cellulosic fibers. While both the reaction producing carbon monoxide and that producing carbon dioxide may be generally said to be exothermic in nature in the context of and at the local site of cellulosic material combustion, the significant difference is apparently that, whereas the carbon dioxide reaction produces sufficient heat to maintain itself and sustain the burning, the carbon monoxide reaction does not. Hence, an appropriate phosphoric acid precursor material of the type broadly contemplated herein as phosphorous fire retardant component, for use conjointly with the tetraborate component, will serve the desired purposes with pronounced efficiency whereby to overcome, stop and/or prevent smoldering or glowing of the burning site.

The conjoint tetraborate component, i.e. sodium tetraborate containing molecularly bound water, progressively liberates its molecularly bound water during incipient burning of the cellulosic material which, it is believed, at least in part acts in a continuous and sustaining manner to quench and snuff out the flame. While it would appear that it also contributes to the prevention of smoldering or glowing of the burning site, such action of the sodium tetraborate component in this regard is generally not found to be sufficient by itself even in the case of the decahydrate, borax.

Hence, the sodium tetraborate component containing molecularly bound water and the ammonium phosphate component or phosphorous fire retardant component, serving as such phosphoric acid precursor, are used in conjoint associative combination within the broad proportional ranges heretofore noted and in a combined amount effective for imparting an overall active flame retarding property to the cellulosic material in question. While other sodium tetraborates such as the pentahydrate may be used, as earlier indicated, they are generally not as desirable as the decahydrate either in terms of overall economy or performance efficiency.

The specially prepared and constituted glass particles component is believed to function during the admixing generally as a physical cutting or agglomerate reducing agent whereby to break up mechanically the particles of the other two components which have a normal tendency to agglomerate due to their very nature, and in turn as a highly surface active absorbent material or moisture scavenging agent to prevent the particles of the other two components from adhering to one another and caking or recaking. Thus, the glass component serves to prevent sticking and caking or resticking and recaking of the particles of the other two components in the admixture composition. Its further overall function is that it acts as a free flow imparting agent, physically separating or diluting the particles of the other two components, and acting perhaps as an inert lubricant as well as a drying agent or moisture protector for preventing such sticking or caking of the other ingredients. Being incombustible, such glass component by its very nature also aids in the fire or flame retarding role of the overall system as will be appreciated.

In this regard, the fractured finely ground solid powder soda-containing silicate glass particle component of the composite synergistic admixture system of the present invention may be, for example, composed of solid, generally uniform density, powder particles (as distinguished from hollow spheres or microballoons) of any soda-containing silicate glass, especially soda-lime-silicate glass, new or used, or any mixtures thereof, including glass particles from any original or recycled source, e.g. bottles, window panes, jars, etc.

While the present invention broadly contemplates the inclusion of sodium-containing borosilicate type glass, for example, as a solid powder particulate glass ingredient, nevertheless, as based upon information to date, since this type of glass does not appear to be optimally operative to give the more outstanding improved results as are generally obtainable with soda-lime-silicate glass, such soda-lime-silicate glass will be the presently preferred and most suitable type glass component contemplated herein, and will be used in preference over borosilicate glass for the desired purposes.

The glass intended for inclusion, according to the invention, must be washed clean if necessary and dried before use. The clean glass is then crushed and milled, as appropriate, in the conventional manner, preferably in the absence of moisture, to produce a very finely ground, fractured (and thus inherently sharp-edged in physical form as well as uncoated and nascently active in exposed surface condition in terms of chemical constitution) type solid (as distinguished from hollow or sphere or microballoon) particle powder of inherently high and irregular surface area and essentially active dry moisture absorbent surface condition sufficient for maintaining the particles of the ammonium phosphate component and the sodium tetraborate component in moisture protected disposition and for inhibiting the tendency of such particles to adhere to one another. This product is screened to obtain the desired average particle size fraction. If not immediately used, the finely milled and screened glass powder is desirably maintained in the presence of a suitable desiccant such as silica gel, so that it cannot be attacked by moisture. In any case, the ground particles of glass should be in substantially active dry moisture absorbent surface condition when used, especially since the presence of moisture is generally detrimental to the basic system and the moisture scavenging function of the glass. It will be realized that the grinding of such glass serves to expose fresh active nascent surface areas which are extremely effective for absorbing or adsorbing moisture, as the case may be, and that this feature critically distinguishes the constitution of the specially prepared particles of glass as contemplated herein from normal glass particles.

An average particle size of below about 325 mesh (i.e. below about 0.044 mm.) is generally the most commonly employed particulate glass fraction size. This provides a substantially large effective moisture absorbent collective surface area as a potential reservoir for scavenging moisture to prevent sticking or caking of the other two components in intimate association therewith in the basic composition admixture.

Nevertheless, as aforesaid, other coarser glass particle sizes may also be employed. In particular, for example, glass material of below about 40 mesh (i.e. below about 0.44 mm.) average particle size is more preferred than larger sizes for the understandable reasons earlier stated. Hence, depending upon the results sought various coarse or finer particle sizes may be selected. An intermediate average particle size of below about 200 mesh (i.e. below about 0.074 mm.), for instance, is also suitable in addition to the size ranges and proportions previously discussed.

The following example is set forth by way of illustration and not limitation.

EXAMPLE

Soda-lime-silicate glass from any source (bottles, window panes, jars, etc.) is washed clean, then dried, crushed and milled in a ball mill in conventional manner to obtain predominantly particles having a particle size below about 325 mesh. The resulting powder is screened on a U.S.S. 325 mesh screen and the fractured solid powder particles of glass that pass through the screen (i.e. the minus 325 mesh fraction) are collected and bagged with silica gel as desiccant to prevent moisture contamination. This fraction having an average particle size below about 325 mesh is used as the finely ground soda-lime-silicate glass component to be admixed with the particles of the other two components in providing the composition admixture in question.

Diammonium phosphate, $(NH_4)_2HPO_4$, in dry pulverous condition is ground in a hammer mill to produce a particle size which is predominantly below 325 mesh, and similarly sodium tetraborate decahydrate, $Na_2B_4O_7.10H_2O$, i.e. borax, in dry pulverous condition is separately ground in a 60 ACM micropulverizer to produce a particle size which is also predominantly below 325 mesh. These separate ground products are processed to obtain the desired particle fraction below 325 mesh in a manner similar to the procedure used to obtain the desired glass particle fraction. For best results, an air separator system is used to obtain the proper mesh size in each instance.

The three particle components in appropriate proportions are intimately intermixed in a mechanical mixer for a very short period of time, taking care that friction heat is not generated between the mixing blade and the borax. The mixing is generally accomplished in about one minute, although in some cases mixing can be extended but should not exceed about five minutes, all while concomitantly avoiding autogenous friction heat during the mixing and which will adversely affect the integrity of the content of molecularly bound water present in the borax and detract from the inherent fire retardant capabilities of this component.

The resulting fire retardant composition constitutes an intimate finely divided solids particulate admixture of such three components in substantially dry and free flowing form with the individual particles thereof in substantially uniform distribution therein. All of the above procedures are carried out in the substantial absence of attendant and extraneous moisture in a confined environment and with attendant moisture protection and the starting ingredients are employed in substantially dry solid particle condition.

According to a first preferred formulation on a weight basis, 10 parts diammonium phosphate, 10 parts sodium tetraborate decahydrate, and 4 parts active glass of the stated type, are intermixed to form a free flowing, non-caking, substantially dry, moisture protected admixture.

According to a second preferred formulation on a weight basis, 8.7 parts monoammonium phosphate, 10 parts sodium tetraborate decahydrate, and 6 parts active glass of the stated type, are intermixed to form a similar free flowing, non-caking, substantially dry, moisture protected admixture.

According to a third preferred formulation on a weight basis, 8.7 parts monoammonium phosphate, 10 parts sodium tetraborate decahydrate, and 2 parts active glass of the stated type, are intermixed to form another similar free flowing, non-caking, substantially dry, moisture protected admixture.

According to a fourth preferred formulation on a weight basis, 8.7 parts monoammonium phosphate, 10 parts sodium tetraborate decahydrate, and 8 parts active glass of the stated type, are intermixed to form a further similar free flowing, non-caking, substantially dry, moisture protected admixture.

When the same amounts of ammonium phosphate and sodium tetraborate decahydrate as are present in the aforesaid formulations are intermixed in the absence of the active glass of the stated type, the particles of the resulting admixture soon cake together into relatively hard and non-uniform lumps which are not free flowing, due apparently to the take up of ambient moisture, and such adverse results similarly occur where the active glass of the stated type is replaced in the corresponding admixture by the same amount of ordinary glass particles which inherently do not possess the instant active dry moisture absorbent surface condition and which therefore do not provide the self-preserving free-flowing and non-caking properties for the admixture according to the invention.

Each of the aforesaid formulations according to the invention is respectively intimately intermixed in appropriate proportions with a mass of loose prepulped waste newsprint cellulose material fibers which had been formed separately in a hammer mill. The combining of the respective admixture formulation with its corresponding pre-pulped mass of fibers is also effected in a hammer mill. Alternatively, each such admixture formulation may be simultaneously added to the hammer mill with the waste newsprint cellulosic material before pulping thereof whereupon the pulping will be effected as well as progressive intimate intermixing of the overall ingredients. These processing manipulations are also carried out in a moisture protected environment for the same reasons as noted above and are accomplished relatively rapidly due to the even and uniform nature of the free flowing particles utilized.

Two corresponding substantially dry composite final loose fill products are accordingly prepared from the aforesaid first and second formulations, each having approximately 22% by weight of the particular formulation (22% loading) and 78% by weight of the loose fibers of the cellulosic waste paper material. Similarly, a final loose fill product having about 18% by weight of the aforesaid third formulation (18% loading) and about 82% by weight of such loose cellulosic fibers, and another such product having about 24% by weight of said third formulation (24% loading) and about 76% by weight of the loose cellulosic fibers, are also prepared. In the same way, a final loose fill product having about 18% by weight of the aforesaid fourth formulation and about 82% by weight of the loose cellulosic fibers, is also prepared. The three components of each said formulation according to the invention are evenly and uniformly distributed in situ throughout the pulped mass of fibers with ease in blending due to the absence of moisture promoting caking of the ammonium phosphate and borax particle components, and the various particles of the three components are similarly situated and disposed in entwined associated relation with the adjacent cellulosic fibers.

On the other hand, where the corresponding mixtures of the ammonium phosphate and sodium tetraborate decahydrate, in which the active glass of the stated type either is not included or is replaced by the same amount of ordinary glass particles which inherently do not possess the instant active dry moisture absorbent surface condition, are combined with the cellulosic fibers, the relatively hard and non-uniform lumps present are distributed in the pulped mass only with difficulty and in a substantially uneven and non-uniform manner.

Advantageously, according to the invention, the composite product of the three component admixture in each instance and the corresponding pulped fibers is therefore suitably provided as a loose fill type product of desirable mechanical integrity, as the case may be, for use as home insulation, electrical wire insulation, and the like, as the artisan will appreciate. The scrupulous avoidance of moisture at this point is no longer necessary of course since the desired in situ even and uniform distribution of the particles in the fiber has already taken place. Moreover, the presence of the three components in the formulation in no way inhibits the desired production of loose fill cellulose advantageously usable for insulation purposes as contemplated herein.

Flame smoke tests with each of the foregoing formulation-based fiber composite products satisfy tests performed according to the procedure of ASTM-E84 for a Class 1 product, i.e., one having a flame spread value of 0 to 25 and a smoke development value of less than 50, as compared with a Class 2 product having a flame spread value of 26 to 50 and a smoke development value of at least 50. Such composite products generally have a corresponding bulk density of approximately 2.3 to 2.5, a flame spread value varying from 5 to 20, an energy or fuel contribution varying from 0 to 10, a smoke development value varying from 5 to 30, and a resistance value R (reciprocal of thermal conductivity) of typically 3.7 to 3.8.

In particular, the resulting loose fill product of the aforesaid third formulation at 18% loading with 82% loose cellulose fibers has a flame spread value of 15 to 20, an energy or fuel contribution of 0, and a smoke development value of 15 to 20, whereas the corresponding product of such third formulation at 24% loading with 76% loose cellulose fibers has a flame spread value of 5 to 10, an energy or fuel contribution of 0, and a smoke development value of 5 to 10.

These various products also give satisfactory results in cigarette smolder (smoldering combustion) tests and radiant heating panel (radiant flux) tests.

The monoammonium phosphate containing product has a pH of about 7.0 and being neutral advantageously causes no corrosion of metals or metallic surfaces with which it comes into contact. The diammonium phosphate containing product has a pH of about 8.2 to 8.4, and although slightly alkaline, generally exhibits minimal if any such corrosion.

These products furthermore do not support fungal growth, possess no discernible odor, and contain no starch which might otherwise be available for rodents to eat.

The compositions in question are believed to be surprisingly synergistic in nature and effect, especially because of their self-preserving free flowing and non-caking properties, and correspondingly advantageous in effect both in their free flowing admixture form and in their ultimate in situ distribution in the cellulosic fiber mass.

It will be appreciated that the instant specification and examples are set forth by way of illustration and not limitation, and that various modifications and changes may be made without departing from the spirit and scope of the present invention which is to be limited solely by the scope of the appended claims.

What is claimed is:

1. Fire retardant composition comprising an intimate finely divided solids particulate admixture of ammonium phosphate, sodium tetraborate containing molecularly bound water and fractured finely ground solid powder particles of soda-containing silicate glass, the particles of said glass having a high and irregular surface area and an active dry moisture absorbent surface condition sufficient for maintaining the particles of ammonium phosphate and sodium tetraborate in moisture protected disposition and for inhibiting the tendency of such particles to adhere to one another, the components in the admixture having an average particle size below about 4 mesh, the ammonium phosphate and sodium tetraborate being present in a combined predominant amount of the admixture effective for imparting an active fire retarding property to cellulosic material, and said admixture being in substantially dry and free flowing form with the individual particles thereof in substantially uniform distribution therein.

2. Composition according to claim 1 wherein the particles of glass are substantially pre-cleaned, dry and moisture-protected, fractured, active, uncoated, finely ground solid powder particles of soda-containing silicate glass having a high and irregular surface area and an active dry surface condition.

3. Composition according to claim 2 wherein the particles of glass are soda-lime silicate glass.

4. Composition according to claim 1 wherein the ammonium phosphate is at least one of monoammonium phosphate and diammonium phosphate.

5. Composition according to claim 1 wherein the ammonium phosphate is monoammonium phosphate.

6. Composition according to claim 1 wherein the ammonium phosphate is diammonium phosphate.

7. Composition according to claim 1 wherein the sodium tetraborate is the decahydrate.

8. Composition according to claim 1 wherein the ammonium phosphate is diammonium phosphate and the sodium tetraborate is the decahydrate.

9. Composition according to claim 1 wherein the ammonium phosphate is the monoammonium phosphate and the sodium tetraborate is the decahydrate.

10. Composition according to claim 1 wherein the admixture includes between about 4–13 parts by weight ammonium phosphate, between about 13–6 parts by weight sodium tetraborate and between about 1–9 parts by weight of said particles of glass.

11. Composition according to claim 1 wherein the admixture includes between about 5–13 parts by weight diammonium phosphate, between about 12–8 parts by weight sodium tetraborate and between about 1–7 parts by weight of said particles of glass.

12. Composition according to claim 1 wherein the admixture includes between about 4–11 parts by weight monoammonium phosphate, between about 13–8 parts by weight sodium tetraborate and between about 1–9 parts by weight of said particles of glass.

13. Composition according to claim 1 wherein at least about 80% by weight of particles in the admixture have an average particle size below about 200 mesh and the remaining at most about 20% by weight of such particles have an average particle size below about 100 mesh and above about 200 mesh.

14. Composition according to claim 1 wherein at least about 40% by weight of particles in the admixture have an average particle size below about 600 mesh and the remaining at most about 60% by weight of such particles have an average particle size below about 4 mesh and above about 600 mesh.

15. Fire retardant composition according to claim 1 comprising an intimate finely divided solids particulate admixture of between about 5–13 parts by weight diammonium phosphate, between about 12–8 parts by weight sodium tetraborate decahydrate and between about 1–7 parts by weight substantially pre-cleaned, dry and moisture-protected, fractured, active, uncoated, finely ground solid powder particles of soda-containing silicate glass having a high and irregular surface area and an active dry moisture absorbent surface condition sufficient for maintaining the particles of diammonium phosphate and sodium tetraborate decahydrate in moisture protected disposition and for inhibiting the tendency of such particles to adhere to one another, at least about 80% by weight of the particles of the components in the admixture having an average particle size below about 200 mesh and the remaining at most about 20% by weight of such particles having an average particle size below about 100 mesh and above about 200 mesh, the diammonium phosphate and sodium tetraborate decahydrate being present in a combined predominant amount of the admixture effective for imparting an active fire retarding property to cellulosic material, and said admixture being in substantially dry and free flowing form with the individual particles thereof in substantially uniform non-agglomerated distribution therein.

16. Composition according to claim 15 wherein substantially all of the particles of the components in the admixture have an average particle size of at most about 200 mesh.

17. Fire retardant composition according to claim 1 comprising an intimate finely divided solids particulate admixture of between about 4–11 parts by weight monoammonium phosphate, between about 13–8 parts by weight sodium tetraborate decahydrate and between about 1–9 parts by weight substantially pre-cleaned, dry and moisture-protected, fractured, active, uncoated, finely ground solid powder particles of soda-containing silicate glass having a high and irregular surface area and an active dry moisture absorbent surface condition sufficient for maintaining the particles of monoammonium phosphate and sodium tetraborate decahydrate in moisture protected disposition and for inhibiting the tendency of such particles to adhere to one another, at least about 80% by weight of the particles of the components in the admixture having an average particle size below about 200 mesh and the remaining at most about 20% by weight of such particles having an average particle size below about 100 mesh and above about 200 mesh, the monoammonium phosphate and sodium tetraborate decahydrate being present in a combined predominant amount of the admixture effective for imparting an active fire retarding property to cellulosic material, and said admixture being in substantially dry and free flowing form with the individual particles thereof in substantially uniform non-agglomerated distribution therein.

18. Composition according to claim 17 wherein substantially all of the particles of the components in the admixture have an average particle size of at most about 200 mesh.

19. Fire retardant composition according to claim 1 wherein the admixture is combined with fibers of cellulosic material in the form of a composite fire retardant product in which the three components of the admixture are in substantially uniform distribution throughout the cellulosic material and in intimate association with the corresponding fibers thereof.

20. Composition according to claim 19 wherein the composite product includes between about 10–30% by weight of the admixture and between about 90–70% by weight of the cellulosic material.

21. Composition according to claim 20 wherein the admixture includes between about 4–13 parts by weight ammonium phosphate, between about 13–6 parts by weight sodium tetraborate and between about 1–9 parts by weight of said particles of glass, and wherein at least about 80% by weight of particles in the admixture have an average particle size below about 200 mesh and the remaining at most about 20% by weight of such particles have an average particle size below about 100 mesh and above about 200 mesh.

22. Composition according to claim 21 wherein substantially all of the particles of the components in the admixture have an average particle size of at most about 200 mesh.

23. Composition according to claim 19 wherein the composite product is in the form of a loose fill product in which the individual particles of glass are disposed in situ in entwined relation with the adjacent fibers of cellulosic material.

24. Method for providing an improved composite fire retardant cellulosic product which comprises incorporating an admixture according to claim 1 into cellulosic material by intimately intermixing the admixture in substantially dry condition with fibers of the cellulosic material in substantially dry condition and in a confined environment in the substantial absence of moisture until the three components of the admixture are in substantially uniform distribution therein and the individual particles therein are disposed in entwined relation with the adjacent fibers of cellulosic material.

25. Method according to claim 24 wherein the ingredients are combined in the proportion of between about 10-30% of the admixture and between about 90-70% of the cellulosic material.

26. Method according to claim 25 wherein the admixture includes between about 4-13 parts by weight ammonium phosphate, between about 13-6 parts by weight sodium tetraborate and between about 1-9 parts by weight of said particles of glass, and wherein at least about 80% by weight of particles in the admixture have an average particle size below about 200 mesh and the remaining at most about 20% by weight of such particles have an average particle size below about 100 mesh and above about 200 mesh.

27. Method according to claim 26 wherein substantially all of the particles of the components in the admixture have an average particle size of at most about 200 mesh.

28. Method according to claim 24 wherein the composite product is formed into a loose fill product in which the individual particles therein are disposed in situ in entwined relation with the adjacent fibers of cellulosic material.

29. Method according to claim 24 wherein the intermixing is effected by physical percussion of the ingredients in a mill.

30. Method for providing a fire retardant composition according to claim 1 which comprises intimately intermixing the three components of the admixture is substantially dry condition and in a confined environment in the substantial absence of moisture and in the substantial absence of autogenous mixing heat.

31. Method according to claim 30 wherein the admixture includes between about 4-13 parts by weight ammonium phosphate, between about 13-6 parts by weight sodium tetraborate and between about 1-9 parts by weight of said particles of glass, and wherein at least about 80% by weight of particles in the admixture have an average particle size below about 200 mesh and the remaining at most about 20% by weight of such particles have an average particle size below about 100 mesh and above about 200 mesh.

32. Method according to claim 31 wherein substantially all of the particles of the components in the admixture have an average particle size of at most about 200 mesh.

* * * * *